United States Patent
Dearien et al.

(10) Patent No.: US 10,659,314 B2
(45) Date of Patent: May 19, 2020

(54) COMMUNICATION HOST PROFILES

(71) Applicant: Schweitzer Engineering Laboratories, Inc., Pullman, WA (US)

(72) Inventors: Jason A. Dearien, Moscow, ID (US); Rhett Smith, Kuna, ID (US); Marc Ryan Berner, Monroe, WA (US)

(73) Assignee: Schweitzer Engineering Laboratories, Inc., Pullman, WA (US)

( * ) Notice: Subject to any disclaimer, the term of this patent is extended or adjusted under 35 U.S.C. 154(b) by 204 days.

(21) Appl. No.: 14/803,688

(22) Filed: Jul. 20, 2015

(65) Prior Publication Data

US 2017/0026252 A1 Jan. 26, 2017

(51) Int. Cl.
*H04L 12/24* (2006.01)
*H04L 12/26* (2006.01)
*H04L 29/08* (2006.01)

(52) U.S. Cl.
CPC .......... *H04L 41/20* (2013.01); *H04L 43/0829* (2013.01); *H04L 43/0864* (2013.01); *H04L 67/30* (2013.01)

(58) Field of Classification Search
CPC ...... H04L 41/20; H04L 43/0829; H04L 67/30
USPC ........................................................ 709/223
See application file for complete search history.

(56) References Cited

U.S. PATENT DOCUMENTS

| 6,747,957 | B1 | 6/2004 | Pithawala |
| 7,218,632 | B1 | 5/2007 | Bechtolsheim |
| 7,376,831 | B2 | 5/2008 | Kollmyer |
| 7,872,983 | B2 | 1/2011 | Lai |

(Continued)

FOREIGN PATENT DOCUMENTS

| EP | 2765751 | 8/2014 |
| KR | 20150051107 | 5/2015 |
| WO | 2015038040 | 3/2015 |

OTHER PUBLICATIONS http://ieeexplore.ieee.org/document/6688017/, Adam Cahn, Software-Defined Energy Communication Networks: From Substation Automation to Future Smart Grids, Oct. 21, 2013, 2013 IEEE Conference, p. 560-561.*

(Continued)

*Primary Examiner* — Oleg Survillo
*Assistant Examiner* — Christopher P Cadorna
(74) *Attorney, Agent, or Firm* — Jared L. Cherry

(57) ABSTRACT

The present disclosure pertains to systems and methods for automating the configuration of communication hosts in a software defined network (SDN) associated with an electric power transmission and distribution system. The systems and methods presented herein may utilize communication host profiles to specify various repeatable attributes and customizable attributes that may be utilized to configure the communication host and the SDN. In one embodiment, a system may comprise a communication host profile subsystem configured to select a communication host profile associated with a communication host. The host communication profile subsystem may configure the communication host based on one or more repeatable attributes and on one or more customizable attributes specified in the host communication profile. A traffic routing system may further configure a plurality of communication flows in the SDN based on the communication host based on the host communication profile.

8 Claims, 6 Drawing Sheets

(56) References Cited

U.S. PATENT DOCUMENTS

| | | | |
|---|---|---|---|
| 8,553,544 | B2 | 10/2013 | Lai |
| 8,800,044 | B2 | 8/2014 | Raad |
| 9,038,151 | B1 | 5/2015 | Chua |
| 9,237,129 | B2 | 1/2016 | Ling |
| 9,286,171 | B2 | 3/2016 | Cardona |
| 9,432,255 | B1 | 8/2016 | Hasan |
| 9,432,380 | B2 | 8/2016 | Margalit |
| 9,680,588 | B2 | 6/2017 | Connolly |
| 9,686,125 | B2 | 6/2017 | Smith |
| 9,769,060 | B2 | 9/2017 | Dearien |
| 2002/0172157 | A1 | 11/2002 | Rhodes |
| 2003/0112821 | A1 | 6/2003 | Cleveland |
| 2003/0125924 | A1 | 7/2003 | Lines |
| 2003/0133443 | A1 | 7/2003 | Klinker |
| 2003/0188159 | A1 | 10/2003 | Josset |
| 2005/0025141 | A1 | 2/2005 | Chao |
| 2005/0078672 | A1 | 4/2005 | Caliskan |
| 2005/0192008 | A1* | 9/2005 | Desai ............ G06F 21/335 |
| | | | 455/435.2 |
| 2007/0177600 | A1* | 8/2007 | Suzuki ............ H04L 370/392 |
| 2008/0005558 | A1 | 1/2008 | Hadley |
| 2008/0080384 | A1 | 4/2008 | Atkins |
| 2009/0257743 | A1 | 10/2009 | Chung |
| 2009/0285093 | A1 | 11/2009 | Bolt |
| 2009/0313189 | A1 | 12/2009 | Sun |
| 2010/0241608 | A1 | 9/2010 | Huang |
| 2011/0085567 | A1 | 4/2011 | Beecroft |
| 2011/0087952 | A1 | 4/2011 | Marin |
| 2013/0077477 | A1 | 3/2013 | Daraiseh |
| 2013/0108259 | A1 | 5/2013 | Srinivas |
| 2013/0159865 | A1 | 6/2013 | Smith |
| 2013/0212285 | A1 | 8/2013 | Hoffmann |
| 2013/0250770 | A1* | 9/2013 | Zou ............ H04L 47/19 |
| | | | 370/238 |
| 2013/0263247 | A1 | 10/2013 | Jungck |
| 2013/0294228 | A1 | 11/2013 | Ahuja |
| 2014/0025945 | A1 | 1/2014 | McGrew |
| 2014/0029451 | A1 | 1/2014 | Nguyen |
| 2014/0064100 | A1 | 3/2014 | Edwards et al. |
| 2014/0112130 | A1 | 4/2014 | Yang et al. |
| 2014/0115706 | A1 | 4/2014 | Silva et al. |
| 2014/0129700 | A1 | 5/2014 | Mehta |
| 2014/0153572 | A1 | 6/2014 | Hampel |
| 2014/0160939 | A1 | 6/2014 | Arad |
| 2014/0226467 | A1 | 8/2014 | Park |
| 2014/0241345 | A1 | 8/2014 | DeCusatis |
| 2014/0245387 | A1 | 8/2014 | Colpo |
| 2014/0280834 | A1 | 9/2014 | Medved |
| 2014/0325038 | A1 | 10/2014 | Kis |
| 2014/0325649 | A1 | 10/2014 | Zhang |
| 2014/0371941 | A1* | 12/2014 | Keller ............ H02J 13/0006 |
| | | | 700/297 |
| 2014/0376406 | A1 | 12/2014 | Kim |
| 2015/0081762 | A1 | 3/2015 | Mason et al. |
| 2015/0112933 | A1 | 4/2015 | Satapathy |
| 2015/0195190 | A1 | 7/2015 | Shah Heydari |
| 2015/0312658 | A1 | 10/2015 | Winzer |
| 2015/0363522 | A1 | 12/2015 | Maurya |
| 2016/0043996 | A1 | 2/2016 | Syed Mohamed |
| 2016/0119299 | A1 | 4/2016 | Amulothu |
| 2016/0142427 | A1 | 5/2016 | de los Reyes |
| 2016/0165454 | A1* | 6/2016 | Li ............ H04W 88/16 |
| | | | 370/254 |
| 2016/0330076 | A1* | 11/2016 | Tiwari ............ H04L 41/0806 |
| 2016/0337247 | A1 | 11/2016 | Yao |
| 2016/0344592 | A1* | 11/2016 | Cook ............ H04L 41/12 |
| 2016/0373344 | A1* | 12/2016 | Wohlert ............ H04L 45/302 |
| 2017/0026225 | A1 | 1/2017 | Smith |
| 2017/0026226 | A1 | 1/2017 | Grussling |
| 2017/0026243 | A1 | 1/2017 | Berner |
| 2017/0026276 | A1 | 1/2017 | Dearien |
| 2017/0026291 | A1 | 1/2017 | Smith |
| 2017/0026292 | A1 | 1/2017 | Smith |
| 2017/0026349 | A1 | 1/2017 | Smith |

OTHER PUBLICATIONS

James S. Thorp, The Protection System in Bulk Power Networks, Power Systems Engineering Research Center (Year: 2003).*

Braun, Wolfgang, Menth, Michael, Software-Defined Networking Using OpenFlow: Protocols, Applications and Architectural Design Choices, Future Internet, May 12, 2014.

Cahn, Adam, Hoyos, Juan, Hulse, Matthew, Keller, Eric, Software-Defined Energy Communication Networks: From Substation Automation to Future Smart Grids, Smart Grid Communications, IEEE Oct. 2013.

Dally, William J., Virtual-Channel Flow Control, IEEE Transactions on Parallel and Distributed Systems, vol. 3, No. 2, Mar. 1992.

Jain, Sushant, et al., B4: Experience with a Globally-Deployed Software Defined WAN, ACM SIGCOMM Computer Communication Review, vol. 43 Issue 4, pp. 3-14. Oct. 2013.

Monaco, Matthew, Michel, Oliver, Keller, Eric, Applying Operating System Principles to SDN Controller Design, Hotnets '13, Nov. 2013.

Drutskoy, Dmitry, Keller, Eric, Rexford, Jennifer, Scalable Network Virtualization in Software-Defined Networks, IEEE Internet Computing, vol. 17, Issue: 2, Nov. 27, 2012.

Kuzniar, Maciej, et al., Automatic Failure Recovery for Software-Defined Networks, HotSDN '13, Aug. 16, 2013.

Mizrahi, Tal, Moses, Yoram. ReversePTP: A Software Defined Networking Approach to Clock Synchronization, HotSDN '14, Aug. 22, 2014.

Ramos, Ramon Marques, et al. SlickFlow: Resilient Source Routing in Data Centere Networks Unlocked by OpenFlow, 2013 IEEE 38th Conference on Local Computer Networks, Oct. 2013.

Torhonen, Ville, Designing a Software-Defined Datacenter, Master of Science Thesis, Tampere University of Technology, May 2014.

PCT/US2016/038139 Patent Cooperation Treaty, International Search Report and Written Opinion of the International Searching Authority, dated Sep. 9, 2016.

PCT/US2016/038419 Patent Cooperation Treaty, International Search Report and Written Opinion of the International Searching Authority, dated Aug. 30, 2016.

PCT/US2016/039582 Patent Cooperation Treaty, International Search Report and Written Opinion of the International Searching Authority, dated Feb. 8, 2017.

PCT/US2016/039081 Patent Cooperation Treaty, International Search Report and Written Opinion of the International Searching Authority, dated Sep. 8, 2016.

PCT/US2016/039079 Patent Cooperation Treaty, International Search Report and Written Opinion of the International Searching Authority, dated Oct. 12, 2016.

* cited by examiner

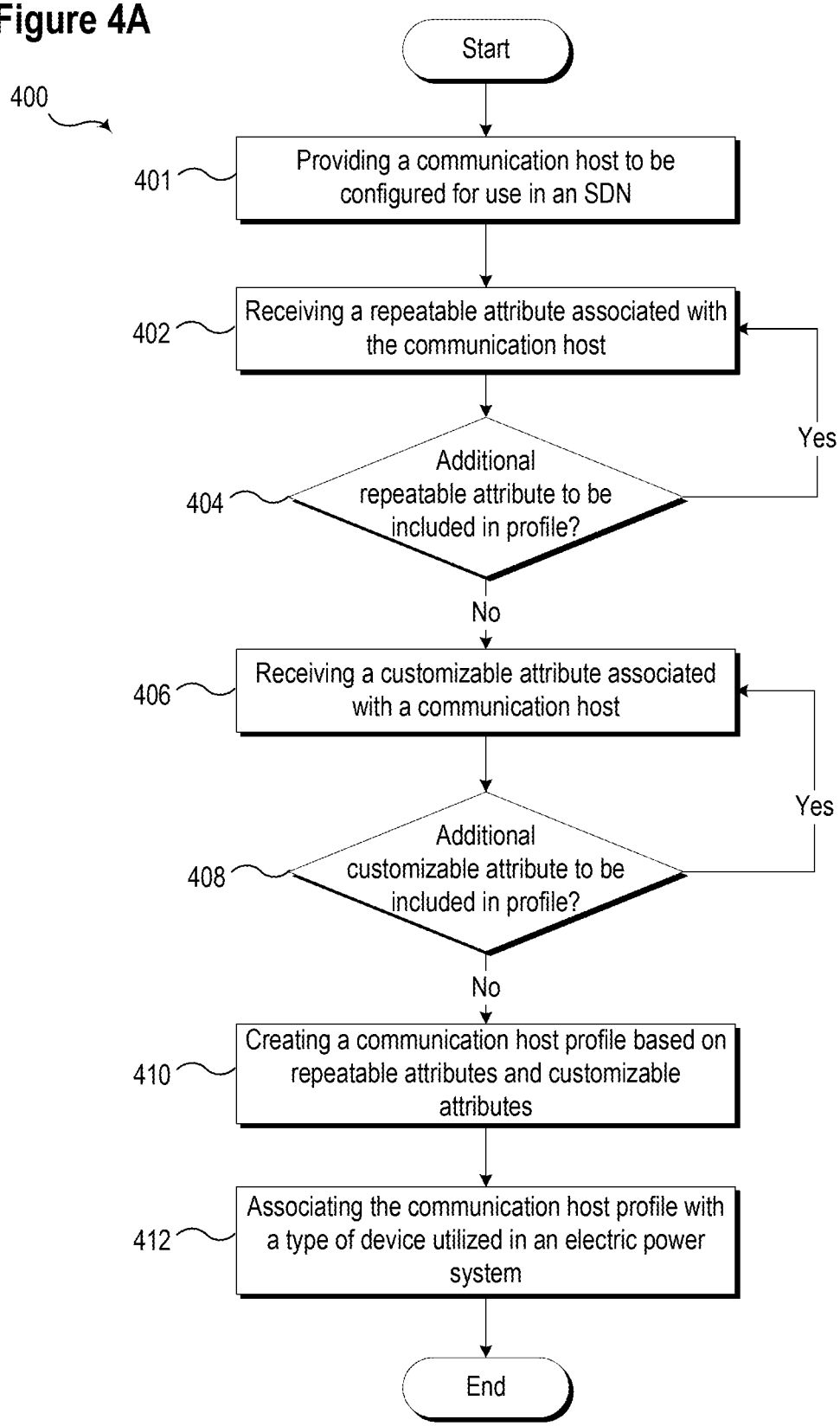

COMMUNICATION HOST PROFILES

FEDERALLY SPONSORED RESEARCH OR DEVELOPMENT

This invention was made with U.S. Government support under Contract No.: DOE-OE0000678. The U.S. Government may have certain rights in this invention.

TECHNICAL FIELD

The present disclosure pertains to systems and methods for configuring communication hosts in a software defined network ("SDN"). More specifically, but not exclusively, the present disclosure pertains to reducing the user burden of configuring an SDN and increasing the reliability of the SDN by generating communication host profiles that may be utilized in devices of the same type in the SDN

BRIEF DESCRIPTION OF THE DRAWINGS

Non-limiting and non-exhaustive embodiments of the disclosure are described, including various embodiments of the disclosure, with reference to the figures, in which:

FIG. 4A illustrates a flow chart of a method for creating a communication host profile consistent with embodiments of the present disclosure.

DETAILED DESCRIPTION

Figure 1:
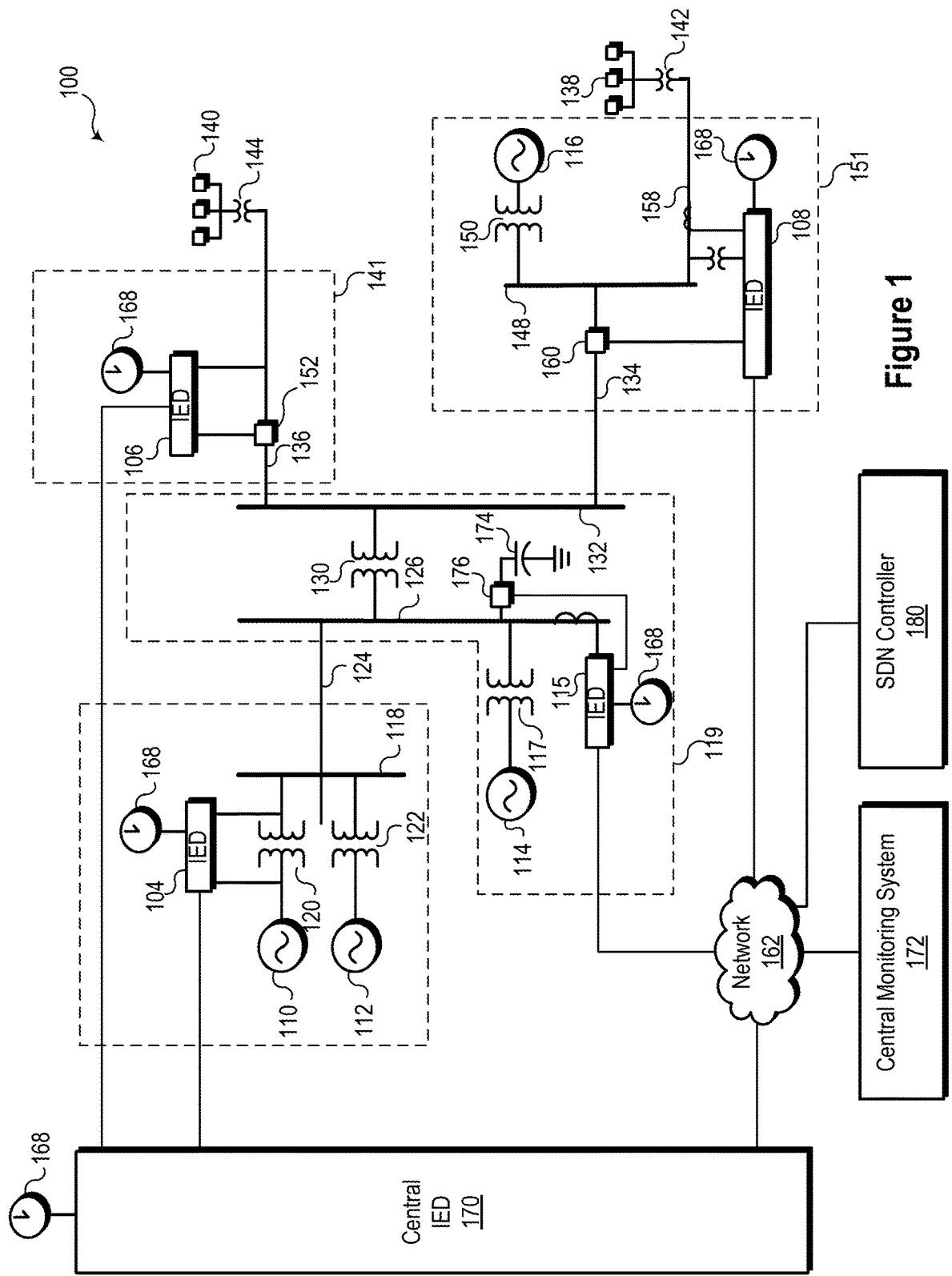
FIG. 1 illustrates a simplified one-line diagram of an electric power transmission and distribution system in which an SDN may facilitate communication among a plurality of communication hosts consistent with embodiments of the present disclosure.

Modern electric power distribution and transmission systems may incorporate a variety of communication technologies to communicate data used to monitor and protect the system. The communication equipment may be configured and utilized to facilitate an exchange of data among a variety of devices that monitor conditions on the power system and implement control actions to maintain the stability of the power system. The communication networks may carry information used for the proper assessment of power system conditions and for implementing control actions based on such conditions. Such messages may be subject to time constraints because of the potential for rapid changes in conditions in an electric power transmission and distribution system. In other words, if the communication of some messages is delayed, the data in the messages may no longer be accurate or useful to a receiving device.

Some electric power transmission and distribution systems may incorporate software defined network ("SDN") technologies. SDN technologies offer a variety of features that may be advantageous in electric power systems (e.g., deny-by-default security, better latency control, symmetric transport capabilities, redundancy and fail over planning, etc.).

An SDN allows a programmatic change control platform, which allows an entire communication network to be managed as a single asset, simplifies the understanding of the network, and enables continuous monitoring of a network. In an SDN, the systems that decide where the traffic is sent (i.e., the control plane) are separated from the systems that perform the forwarding of the traffic in the network (i.e., the data plane).

The control plane may be configured and monitored by an SDN controller. The control plane may be used to achieve the optimal usage of network resources by creating specific traffic flows through the communication network. A traffic flow, as the term is used herein, refers to a set of parameters used to match and take action based on network packet contents. Traffic flows may permit specific paths based on a variety of criteria that offer significant control and precision to operators of the network. In contrast, in large traditional networks, trying to match a network discovered path with an application desired data path may be a challenging task involving changing configurations in many devices. To compound this problem, the management interfaces and feature sets used on many devices are not standardized. Still further, network administrators often need to reconfigure the network to avoid loops, gain route convergence speed, and prioritize a certain class of applications.

Significant complexity in managing a traditional network in the context of an electric power transmission and distribution system arises from the fact that each network device (e.g., a switch or router) may have control logic and data forwarding logic integrated together. For example, in a traditional network router, routing protocols such as Routing Information Protocol (RIP) or Open Shortest Path First (OSPF) constitute the control logic that determines how a packet should be forwarded. The paths determined by the routing protocol are encoded in routing tables, which are then used to forward packets. Similarly, in a Layer 2 device such as a network bridge (or network switch), configuration parameters and/or Spanning Tree Algorithm (STA) constitute the control logic that determines the path of the packets. Thus, the control plane in a traditional network is distributed in the switching fabric (network devices), and as a consequence, changing the forwarding behavior of a network involves changing configurations of many (potentially all) network devices.

In an SDN, a controller embodies the control plane and determines how packets (or frames) should flow (or be forwarded) in the network. The controller communicates this information to the network devices, which constitute the data plane, by setting the forwarding tables in the devices. This enables centralized configuration and management of a network. As such, the data plane in an SDN consists of relatively simple packet forwarding devices with a communications interface to the controller to receive forwarding information. In addition to simplifying management of a network, an SDN architecture may also enable monitoring and troubleshooting features that may be beneficial for use in an electric power distribution system, including but not limited to: mirroring a selected traffic flow rather than mirroring a whole port; alarming on bandwidth when it gets close to saturation; providing metrics (e.g., counters and meters for quality of service, packet counts, errors, drops, or overruns, etc.) for a specified flow; permitting monitoring of specified applications rather than monitoring based on VLANs or MAC addresses.

Traffic in an SDN is designed so that the communications are subject to deny-by-default security, and communication devices do not forward any traffic in an SDN until a flow forwarding rule is created to allow the traffic. The deny-by-default security provides considerable security; however, the deny-by-default security may create challenges for users that must specify each communication flow needed in the network. The commissioning phase may present difficulty because a large number of devices may require configuration, and the configuration of the network may be changing quickly. The addition of a new device may also present difficulty because it may require that operators of the network reacquaint themselves with the process of commissioning devices. In some cases, networks may remain in service for many years, and thus, the addition of new devices may be separated by large spans of time.

The inventors of the present disclosure have recognized that improving the ease of configuring communication hosts in an SDN associated with an electric power generation and distribution system may provide benefits to operators of such networks. Accordingly, systems and networks consistent with the present disclosure may utilize communication host profiles to facilitate the configuration of a variety of devices. A host profile may represent a plurality of attributes associated with a type of device in a network. The host profile may reduce or eliminate the configuration burden associated with adding a new device of the same type to a network. The reduced configuration burden may be attributable to providing in the host profile repeatable settings that are shared among devices of the same type. For example, the plurality of attributes may include: a type associated with the communication flow, a priority associated with the communication flow, alarm set points, and the like. Further, the plurality of attributes in the host profile may be utilized to generate a variety of customizable attributes or to facilitate the configuration of the new device or other devices in the SDN. For example, the customizable attributes may include identifying sources of data to be routed to the newly added device, identifying recipients to receive data from the newly added device, and/or identifiers associated with the device (e.g., an IP address).

Still further, in some embodiments use of host profiles may not only aid in the commissioning of new devices, but also may aid in maintaining the operation of the network. Specifically, some host profiles may include alarm set points that may provide indications about the reliability, capacity, and elasticity of the network. The consistent use of alarm set points across a network may alert network operators when a network is reaching specified thresholds (e.g., bandwidth utilization/saturation, packet loss metrics, latency metrics, etc.) or experiencing other issues.

The embodiments of the disclosure will be best understood by reference to the drawings, wherein like parts are designated by like numerals throughout. It will be readily understood that the components of the disclosed embodiments, as generally described and illustrated in the figures herein, could be arranged and designed in a wide variety of different configurations. Thus, the following detailed description of the embodiments of the systems and methods of the disclosure is not intended to limit the scope of the disclosure, as claimed, but is merely representative of possible embodiments of the disclosure. In addition, the steps of a method do not necessarily need to be executed in any specific order, or even sequentially, nor need the steps be executed only once, unless otherwise specified.

In some cases, well-known features, structures or operations are not shown or described in detail. Furthermore, the described features, structures, or operations may be combined in any suitable manner in one or more embodiments. It will also be readily understood that the components of the embodiments as generally described and illustrated in the figures herein could be arranged and designed in a wide variety of different configurations.

Several aspects of the embodiments described may be implemented as software modules or components. As used herein, a software module or component may include any type of computer instruction or computer executable code located in a memory device and/or transmitted as electronic signals over a system bus or wired or wireless network. A software module or component may, for instance, comprise one or more physical or logical blocks of computer instructions, which may be organized as a routine, program, object, component, data structure, etc. that performs one or more tasks or implements particular abstract data types.

In certain embodiments, a particular software module or component may comprise disparate instructions stored in different locations of a memory device, which together implement the described functionality of the module. Indeed, a module or component may comprise a single instruction or many instructions, and may be distributed over several different code segments, among different programs, and across several memory devices. Some embodiments may be practiced in a distributed computing environment where tasks are performed by a remote processing device linked through a communications network. In a distributed computing environment, software modules or components may be located in local and/or remote memory storage devices. In addition, data being tied or rendered together in a database record may be resident in the same memory device, or across several memory devices, and may be linked together in fields of a record in a database across a network.

Embodiments may be provided as a computer program product including a non-transitory computer and/or machine-readable medium having stored thereon instructions that may be used to program a computer (or other electronic device) to perform processes described herein. For example, a non-transitory computer-readable medium may store instructions that, when executed by a processor of a computer system, cause the processor to perform certain methods disclosed herein. The non-transitory computer-readable medium may include, but is not limited to, hard drives, floppy diskettes, optical disks, CD-ROMs, DVD-ROMs, ROMs, RAMs, EPROMs, EEPROMs, magnetic or optical cards, solid-state memory devices, or other types of machine-readable media suitable for storing electronic and/or processor executable instructions.

FIG. 1 illustrates a simplified one-line diagram of an electric power transmission and distribution system 100 in which an SDN may facilitate communication among a plurality of communication hosts consistent with embodiments of the present disclosure. Electric power delivery system 100 may be configured to generate, transmit, and distribute electric energy to loads. Electric power delivery systems may include equipment, such as electric generators (e.g., generators 110, 112, 114, and 116), power transformers (e.g., transformers 117, 120, 122, 130, 142, 144 and 150), power transmission and delivery lines (e.g., lines 124, 134, and 158), circuit breakers (e.g., breakers 152, 160, 176), busses (e.g., busses 118, 126, 132, and 148), loads (e.g., loads 140, and 138) and the like. A variety of other types of equipment may also be included in electric power delivery system 100, such as voltage regulators, capacitor banks, and a variety of other types of equipment.

Substation 119 may include a generator 114, which may be a distributed generator, and which may be connected to bus 126 through step-up transformer 117. Bus 126 may be connected to a distribution bus 132 via a step-down transformer 130. Various distribution lines 136 and 134 may be connected to distribution bus 132. Distribution line 136 may lead to substation 141 where the line is monitored and/or controlled using IED 106, which may selectively open and close breaker 152. Load 140 may be fed from distribution line 136. Further step-down transformer 144 in communication with distribution bus 132 via distribution line 136 may be used to step down a voltage for consumption by load 140.

Distribution line 134 may lead to substation 151, and deliver electric power to bus 148. Bus 148 may also receive electric power from distributed generator 116 via transformer 150. Distribution line 158 may deliver electric power from bus 148 to load 138, and may include further step-down transformer 142. Circuit breaker 160 may be used to selectively connect bus 148 to distribution line 134. IED 108 may be used to monitor and/or control circuit breaker 160 as well as distribution line 158.

Electric power delivery system 100 may be monitored, controlled, automated, and/or protected using intelligent electronic devices (IEDs), such as IEDs 104, 106, 108, 115, and 170, and a central monitoring system 172. In general, IEDs in an electric power generation and transmission system may be used for protection, control, automation, and/or monitoring of equipment in the system. For example, IEDs may be used to monitor equipment of many types, including electric transmission lines, electric distribution lines, current transformers, busses, switches, circuit breakers, reclosers, transformers, autotransformers, tap changers, voltage regulators, capacitor banks, generators, motors, pumps, compressors, valves, and a variety of other types of monitored equipment.

As used herein, an IED (such as IEDs 104, 106, 108, 115, and 170) may refer to any microprocessor-based device that monitors, controls, automates, and/or protects monitored equipment within system 100. Such devices may include, for example, remote terminal units, differential relays, distance relays, directional relays, feeder relays, overcurrent relays, voltage regulator controls, voltage relays, breaker failure relays, generator relays, motor relays, automation controllers, bay controllers, meters, recloser controls, communications processors, computing platforms, programmable logic controllers (PLCs), programmable automation controllers, input and output modules, and the like. The term IED may be used to describe an individual IED or a system comprising multiple IEDs.

A common time signal may be distributed throughout system 100. Utilizing a common or universal time source may ensure that IEDs have a synchronized time signal that can be used to generate time synchronized data, such as synchrophasors. In various embodiments, IEDs 104, 106, 108, 115, and 170 may receive a common time signal 168. The time signal may be distributed in system 100 using a communications network 162 or using a common time source, such as a Global Navigation Satellite System ("GNSS"), or the like.

According to various embodiments, central monitoring system 172 may comprise one or more of a variety of types of systems. For example, central monitoring system 172 may include a supervisory control and data acquisition (SCADA) system and/or a wide area control and situational awareness (WACSA) system. A central IED 170 may be in communication with IEDs 104, 106, 108, and 115. IEDs 104, 106, 108 and 115 may be remote from the central IED 170, and may communicate over various media such as a direct communication from IED 106 or over a wide-area communications network 162. According to various embodiments, certain IEDs may be in direct communication with other IEDs (e.g., IED 104 is in direct communication with central IED 170) or may be in communication via a communication network 162 (e.g., IED 108 is in communication with central IED 170 via communication network 162).

Communication via network 162 may be facilitated by networking devices including, but not limited to, multiplexers, routers, hubs, gateways, firewalls, and switches. In some embodiments, IEDs and network devices may comprise physically distinct devices. In other embodiments, IEDs and network devices may be composite devices, or may be configured in a variety of ways to perform overlapping functions. IEDs and network devices may comprise multi-function hardware (e.g., processors, computer-readable storage media, communications interfaces, etc.) that can be utilized in order to perform a variety of tasks that pertain to network communications and/or to operation of equipment within system 100.

An SDN controller 180 may be configured to interface with equipment in network 162 to create an SDN that facilitates communication between IEDs 170, 115, 108, and monitoring system 172. In various embodiments, SDN controller 180 may be configured to interface with a control plane (not shown) in network 162. Using the control plane, controller 180 may be configured to direct the flow of data within network 162.

In various embodiments, the SDN controller 180 may be configured to operate in connection or to utilize host profiles to facilitate the configuration of devices within network 162 and/or to monitor the operation of network 162. Any of the IEDs in systems 100 may be a communication host, and the configuration of such devices may be achieved using communication host profiles consistent with the present disclosure. In one specific embodiment, one or more of IEDs 104, 106, 108, and 115 may comprise an SEL-351 Protection System relay available from Schweitzer Engineering Laboratories of Pullman, Wash. During the commissioning of a first SEL-351 device in system 100, a host communication profile may be created. When a second or subsequent SEL-351 device is added, the host communication profile may be utilized to facilitate the configuration of the device using the techniques described in greater detail below.

Figure 2:
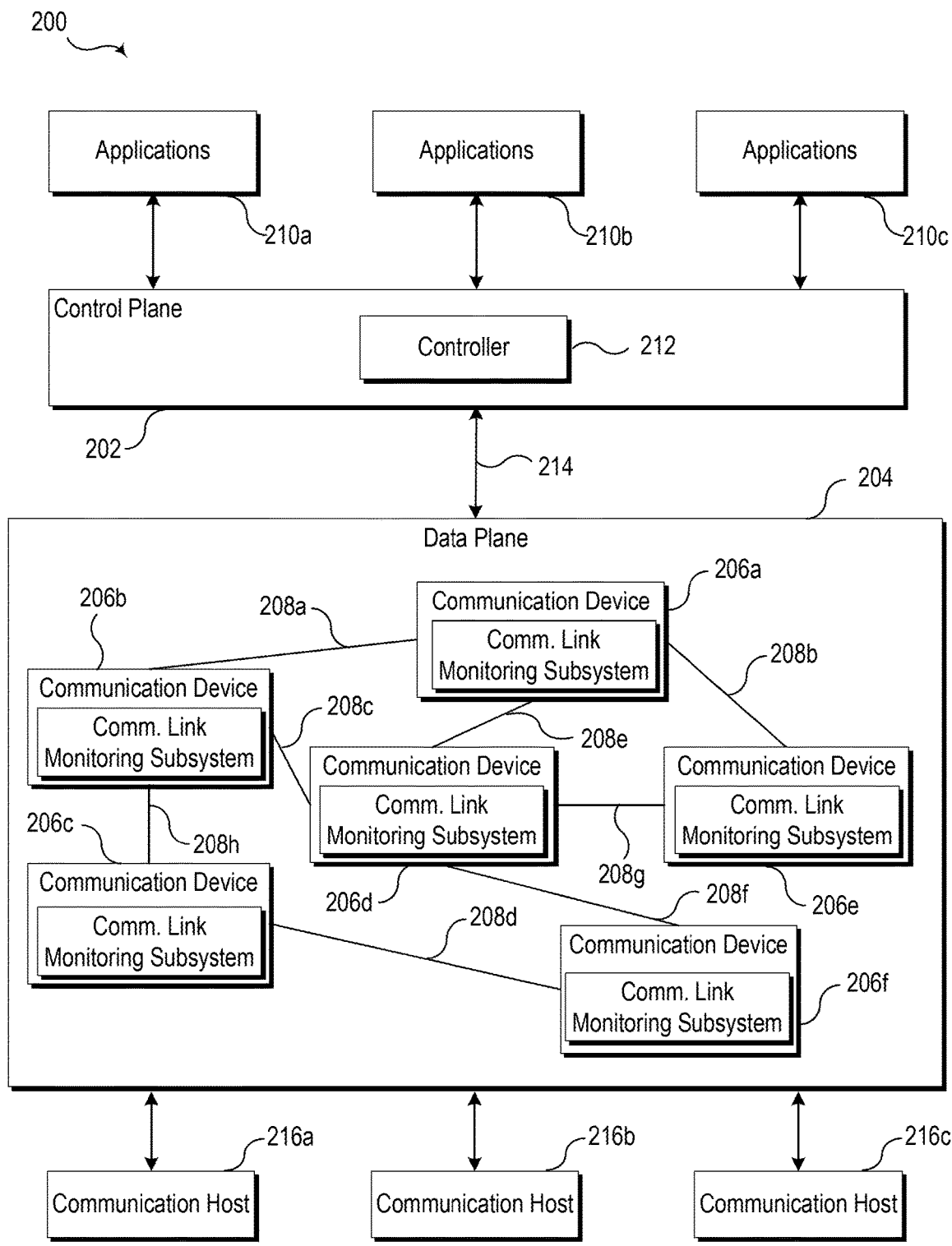
FIG. 2 illustrates a conceptual representation of an SDN architecture including a control plane, a data plane, and a plurality of communication hosts that may be deployed in an electric power transmission and distribution system consistent with embodiments of the present disclosure.

FIG. 2 illustrates a conceptual representation 200 of an SDN architecture including a control plane 202, a data plane 204, and a plurality of applications 210*a*-210*c* that may be deployed in an electric power transmission and distribution system consistent with embodiments of the present disclosure. The control plane 202 directs the flow of data through the data plane 204. More specifically, a controller 212 may communicate with the plurality of communication devices 206*a*-206*f* via an interface 214 to establish traffic flows. The controller may specify rules for routing traffic through the data plane 204 based on a variety of criteria.

As illustrated, the data plane 204 includes a plurality of communication devices 206*a*-206*f* in communication with one another via a plurality of physical communication links 208a-208h. In various embodiments, the communication devices 206a-206f may be embodied as switches, routers, multiplexers, and other types of communication devices. The physical communication links 208a-208h may be embodied as Ethernet, fiber optic, and other forms of data communication channels. As illustrated, the physical communication links 208a-208h between the communication devices 206a-206f may provide redundant connections such that a failure of one of the physical communication links 208a-208h is incapable of completely blocking communication with an affected communication device. In some embodiments, the physical communication links 208a-208h may provide an N−1 redundancy or better.

The plurality of applications 210a-210c may represent a variety of applications 210a-210c operating in an applications plane. In the SDN architecture illustrated in FIG. 2, controller 212 may expose an application programming interface (API) that services 210a-210c can use to configure the data plane 204. In this scenario, controller 212 may act as an interface to the data plane 204 while the control logic resides in the applications 210a-210c. The configuration of controller 212 and applications 210a-210c may be tailored to meet a wide variety of specific needs.

The communication hosts 216a-216c may represent a variety of devices in an electric power transmission and distribution system that produce or consume data. For example, the communication hosts may be embodied as IEDs used to monitor and protect an electric power transmission and distribution system. In one specific embodiment, the communication hosts may be embodied as a pair of transmission line relays configured to monitor an electrical transmission line. The transmission line relays may monitor various aspects of the electric power flowing through the transmission line (e.g., voltage measurements, current measurements, phase measurements, synchrophasers, etc.) and may communicate the measurements to implement a protection strategy for the transmission line. Traffic between the transmission line relays may be routed through the data plane 204 using a plurality of traffic flows implemented by controller 212. Of course, communication hosts 216a-216c may be embodied by a wide range of devices consistent with embodiments of the present disclosure. An electric power transmission and distribution system may include several transmission lines, each with a pair of transmission line relays. Once the first transmission line relay is configured, many of the attributes associated with the configuration may be used by other devices performing similar functions in the same power system. As such, a host communication profile consistent with the present disclosure may be used to reduce the configuration burden associated with configuration of such devices.

The plurality of communication devices 206a-206f may each include a communication link monitoring system that may monitor a plurality of physical communication links 208a-208h. Various parameters may be monitored for different types of physical communication links. For example, if a communication link monitoring system is monitoring a fiber optic communication link, the monitoring system may collect information regarding reflection characteristics, attenuation characteristics, signal-to-noise ratio characteristics, harmonic characteristics, packet loss statics, and the like. If a communication link monitoring system is monitoring an electrical communication link, the monitoring system may collect information regarding voltage measurements, signal-to-noise ratio characteristics, packet loss statics, and the like. The information collected by the communication link monitoring systems may be communicated to the controller 212.

Based on the information collected about the physical communication links 208a-208h, the controller 212 may assess the health of logical communication links between devices in system 200. For example, a logical communication link between communication host 216a and communication host 216c may be created using communication devices 206c and 206f and physical communication link 208d. The controller 212 may receive information about the health of the logical communication link created by communication devices 206c and 206f and physical communication link 208d from the communication link monitoring subsystems in communication devices 206c and 206f. In the event that a problem is detected in the physical communication link 208d, controller 212 may utilize a failover communication path. In various embodiments, the failover path may be specified in advance or may be dynamically created based on various criteria (e.g., available bandwidth, latency, shortest path, etc.). In the event that data traffic must be redirected because of a failure of physical communication link 208d, a new logical communication link may be created. The logical communication link may be embodied utilizing a variety of paths, with the shortest failover path utilizing communication device 206c, physical communication link 208h, communication device 206b, physical communication link 208c, communication device 206d, physical communication link 208f, and communication device 206f.

The communication hosts 216a-c may be associated with host profiles that permit controller 212 to configure the data plane 204 to facilitate operation of each device. Specifically, a host profile associated with one or more of communication hosts 216a-216c may specify a plurality of attributes associated with the configuration of the device.

Figure 3:
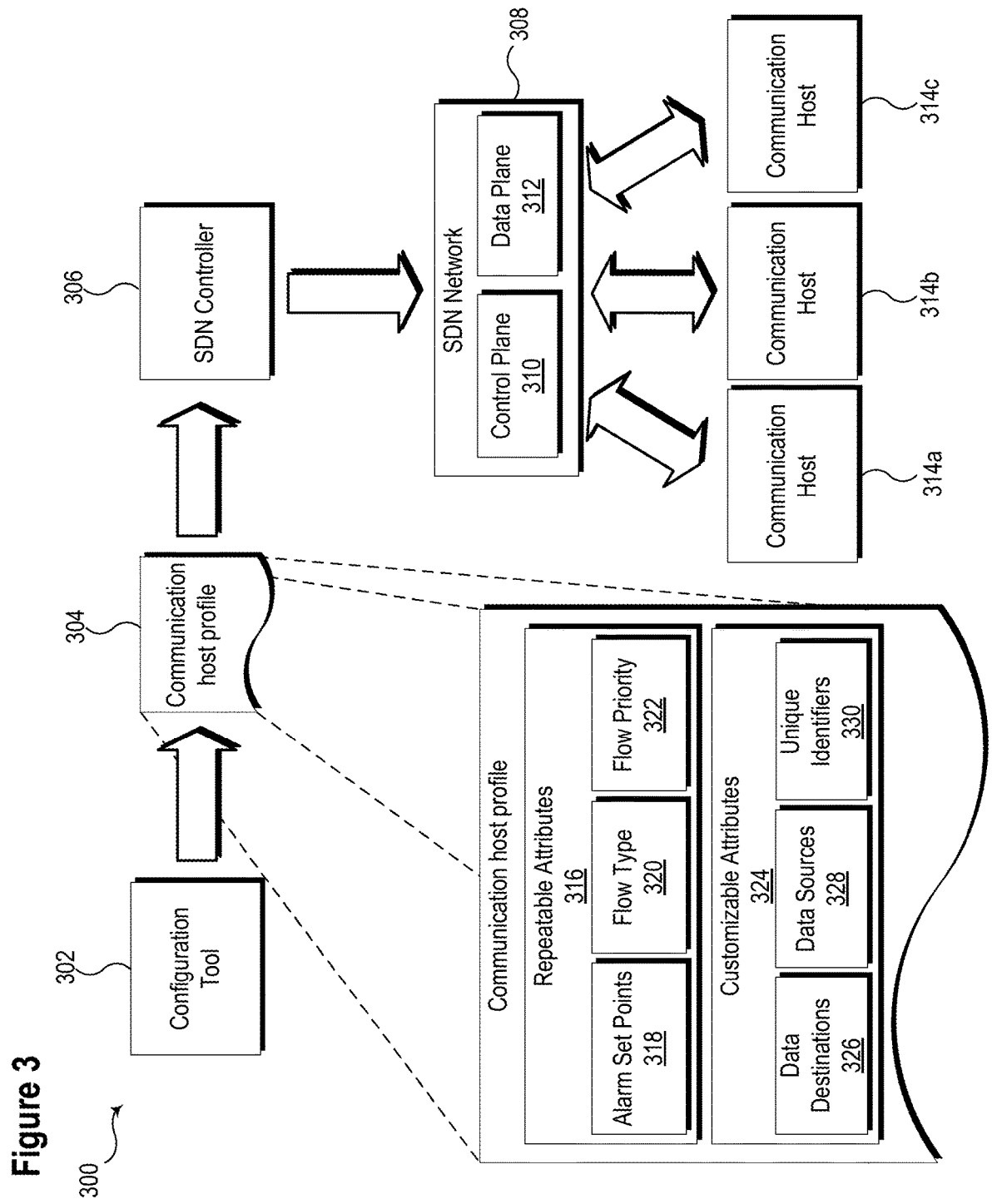
FIG. 3 illustrates a conceptual representation of a system configured to utilize a communication host profile to configure a plurality of devices in an SDN consistent with embodiments of the present disclosure.

FIG. 3 illustrates a conceptual representation of a system 300 configured to utilize a communication host profile 304 to configure a plurality of devices in an SDN consistent with embodiments of the present disclosure. A configuration tool 302 may be configured to generate a communication host profile 304. In various embodiments, the configuration tool may obtain from a user a plurality of attributes associated with a particular type of device. In various embodiments, the communication host profile includes a plurality of repeatable attributes 316 and a plurality of customizable attributes 324. Once a profile has been developed for a specific device, deviations are likely to be relatively small for similar devices used in the same system. As such, the communication host profile 304 may facilitate the configuration of similar devices.

The repeatable attributes 316 may be consistent across a number of devices. In the illustrated embodiment, the repeatable attributes 316 include alarm set points 318, a flow type 320, and a flow priority 322. In other embodiments, other repeatable attributes may be included or certain repeatable attributes may be omitted. The alarm set points 318 may specify a variety of criteria for assessing various criteria associated with the network. In some embodiments, the alarm set points 318 may include bandwidth monitoring, counters and meters for quality of service, packet counts, errors, drops, or overruns, etc. A flow type 320 may specify various types of flow such as, various match criteria like Ether type, destination MAC addresses, destination IP addresses, VLAN, port numbers, or any combination of the supported OpenFlow standard match list. In some embodiments, additional types of flows may be specified using the first 128 byes of the frame. A flow priority 322 may be specified. For example, the priority attribute may be used to identify high priority traffic.

Customizable attributes 324 may be created based on criteria that may be automatically determined or specified by a user. The customizable attributes may include, for example, data destinations 326, data sources 328, and/or unique identifiers 330 that may be associated with a particular communication host. In some circumstances, the specific data destinations 326 and data sources 328 may be specified for each device. Further, each communication host may be given a unique identifier 330 to facilitate routing and tracking of information within the network. The data destinations, data sources, and/or unique identifiers may be specified using IP addresses, MAC addresses, and other techniques for routing and identifying hosts in data communication networks.

The communication host profile 304 may be provided to an SDN controller 306 that may control the configuration of a control plane 310 of SDN 308. The control plane 310 may specify how packets (or frames) should flow (or be forwarded) in the data plane 312 of the network 308. Using the communication host profile 304, the SDN controller 306 may configure the control plane 310 with specific communication flows required by a communication host. The communication flows may enable necessary communication flow among communication hosts 314a-314c through data plane 312.

FIG. 4A illustrates a flow chart of a method 400 for creating a communication host profile consistent with embodiments of the present disclosure. At 401, a communication host to be configured for use in an SDN may be provided. The communication host may require a plurality of attributes to be configured for operation within the SDN. The plurality of attributes may include settings associated with the communication host that enable the communication host to perform a specific function with the SDN.

At 402, a repeatable attribute associated with a communication host may be specified. The repeatable attribute may be consistent across a number of devices of a similar type. In one specified embodiment, the repeatable attribute may include a specific configuration setting shared by transmission line relays in a particular electric power transmission and distribution system. In other embodiments, the repeatable attribute may include alarm set points, flow types, flow priorities, and the like. The repeatable attribute may be specified in a variety of ways. In one example, a manufacturer of a communication host may specify certain repeatable attributes, while in another example an operator of an electric power transmission and distribution system may specify a plurality of repeatable attributes. At 404, it may be determined if additional repeatable attributes are to be provided. Communication host profiles consistent with the present disclosure may include any number of repeatable attributes, each of which may be specified at 402. After all of the repeatable attributes associated with the communication host have been specified, method 400 may continue to 406.

At 406, a customizable attribute associated with a communication host may be specified. Customizable attributes may include a variety of settings or options that may be automatically determined or may be specified by a user for a specific communication host. The customizable attributes may include, for example, data destinations and/or data sources that may be associated with a particular communication host. At 408, method 400 may determine whether additional customizable attributes are to be included in the communication host profile. If additional customizable attributes are to be included, method 400 may return to 406. When all of the customizable attributes have been specified, method 400 may proceed to 410. At 410, a communication host profile may be created based on the repeatable attributes specified at 402 and the customizable attributes specified at 406.

In various embodiments, a host communication profile creation and configuration utility may aid in the process of creating the communication host profile utilizing method 400. In various embodiments, communication hosts that may be associated with communication host profiles may include a large number of user-configurable settings that allow such devices to have considerable flexibility. While the wide array of user-configurable settings may allow for considerable flexibility in the use of the device, the large number of user-configurable settings may also complicate the task of configuring the device. The configuration utility may be configured to guide a user through the configuration process.

At 412, the communication host profile may be associated with a type of device utilized in an electric power system. The communication host profile may be utilized in connection with configuration of devices of the same type in the future. Associating the communication host profile created at 410 with a type of device utilized in an electric power system may be accomplished in various ways. For example, the communication host profile may be associated with a specific device using a variety of unique criteria (e.g., a particular model number provided by a specific manufacturer). In other embodiments, the communication host profile may be associated more generally with a category of devices. Still further, a single communication host profile may be associated with multiple devices or multiple categories of devices, and multiple communication host profiles may be utilized to configure various aspects of a particular device. As one of skill in the art will appreciate, a wide variety of options are available for associating devices with communication host profiles that are consistent with the present disclosure.

Figure 4B:
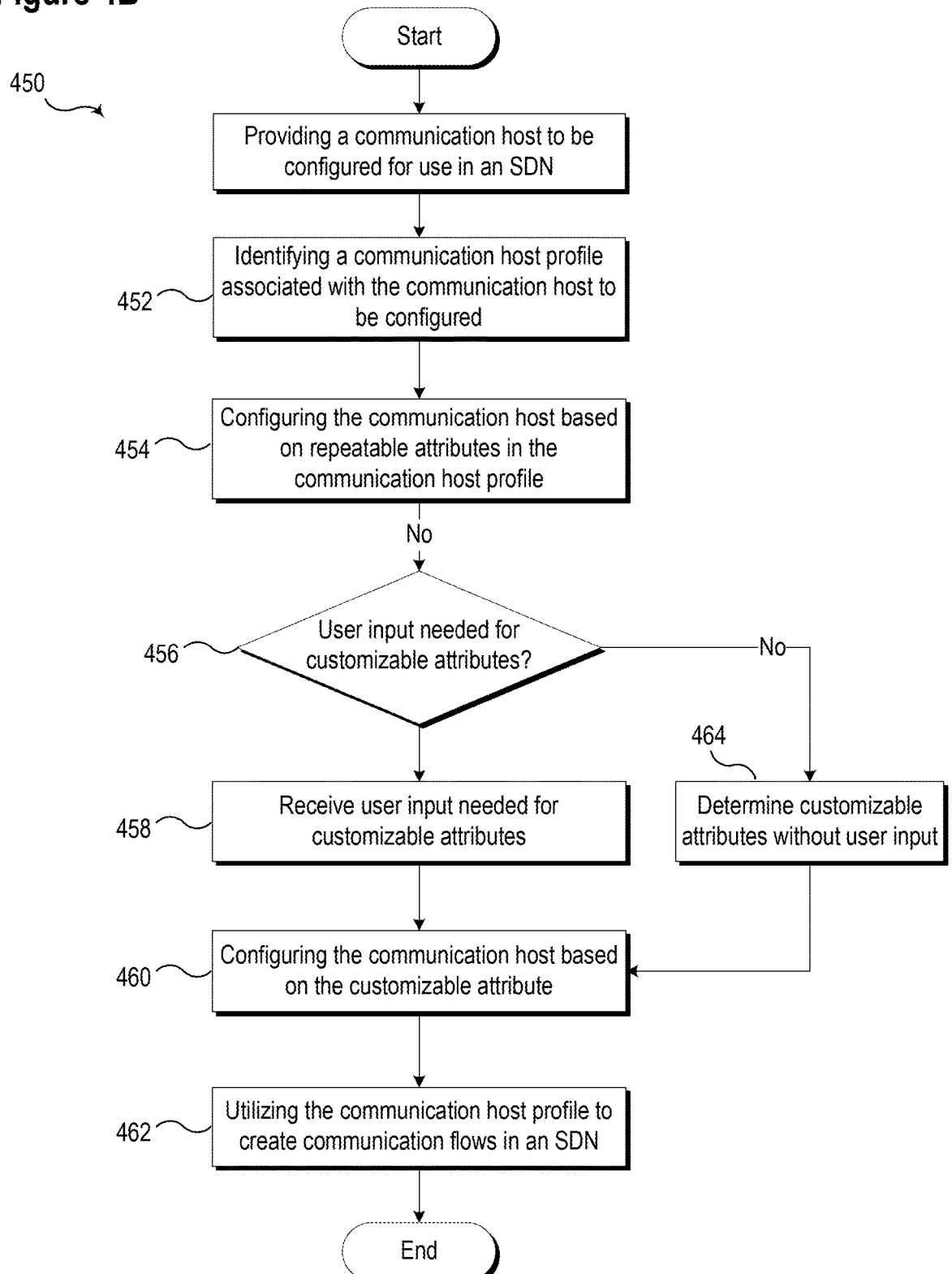
FIG. 4B illustrates a flow chart of a method for utilizing a communication host profile to configure a communication host and a plurality of network devices in an SDN consistent with embodiments of the present disclosure.

FIG. 4B illustrates a flow chart of a method 450 for utilizing a communication host profile to configure a communication host and a plurality of network devices in an SDN consistent with embodiments of the present disclosure. At 452, a communication host profile associated with the communication host to be configured may be identified. The identifying of the appropriate communication host profile may be performed in various ways. For example, in some embodiments the appropriate profile may be selected from a database of available host communication profiles. In such embodiments, the selection of the appropriate host communication profile from the database may be automated based on certain criteria (e.g., a manufacturer model number) or one or more appropriate host communication profiles may be selected by a user. The communication host profile(s) may specify a variety of repeatable attributes and a plurality of customizable attributes associated with a communication host. At 454, the communication host may be configured based on a plurality of repeatable attributes in the communication host profile.

At 456, method 450 may determine whether user input is needed for any of the customizable attributes. In various embodiments, the customizable attributes may be customized for a specific instance or communication host. Such customizable attributes may include, but are not limited to, data destinations, data sources, unique identifiers, and the like. In connection with implementing the settings associated with the communication host profile, necessary user input may be received at 458. If user input is not needed for the customizable attributes, the customizable attributes may be determined without user input at 464. Customizable attributes may be determined without user input in a variety of circumstances. For example, in a network, a range of IP addresses may be specified for particular types of devices, and the next available IP address may simply be assigned to the communication host to be configured. Further, in some embodiments, data destinations or data sources may be determined without user input. At 460, the communication host may be configured based on the customizable attribute At 462, the communication flows needed by the communication host may be created based on the communication host profile in an SDN. The communication flows may implemented by an SDN controller configured to interface with a control plane of an SDN. In some embodiments, a system implementing method 450 may interface with an SDN controller, while in other embodiments, the system may be embodied as an SDN controller configured to implement the method.

Figure 5:
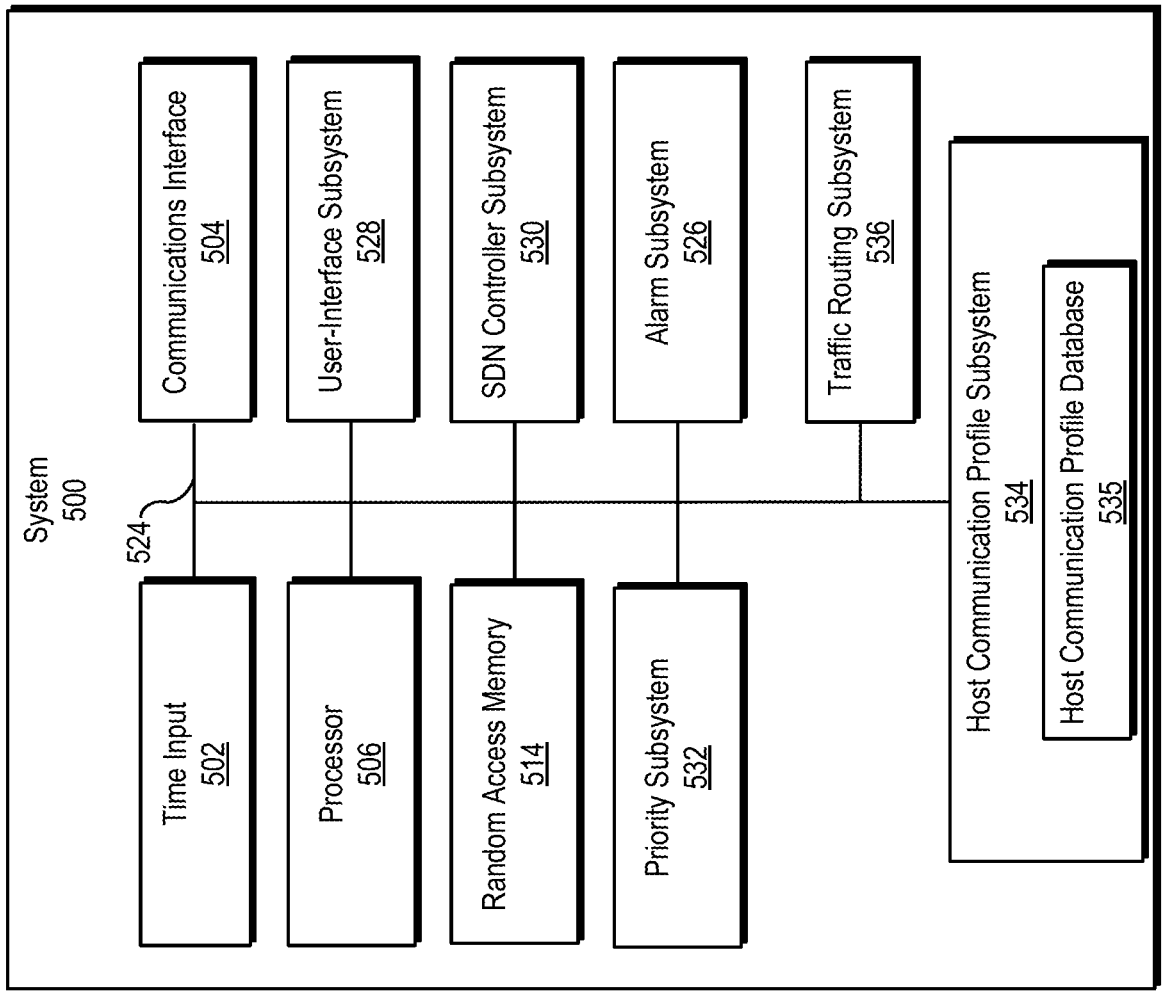
FIG. 5 illustrates a block diagram of a system configured to generate a communication host profile and that may be utilized to configure a communication host and an SDN using a communication host profile consistent with embodiments of the present disclosure.

FIG. 5 illustrates a block diagram of a system 500 configured to generate a communication host profile and that may be utilized to configure a communication host and an SDN using a communication host profile consistent with embodiments of the present disclosure. In some embodiments, system 500 may be implemented using hardware, software, firmware, and/or any combination thereof. Moreover, certain components or functions described herein may be associated with other devices or performed by other devices. The specifically illustrated configuration is merely representative of one embodiment consistent with the present disclosure.

System 500 includes a communications interface 504 configured to communicate with other devices (not shown). Communications interface 504 may facilitate communications with multiple devices. System 500 may further include a time input 502, which may be used to receive a time signal (e.g., a common time reference) allowing system 500 to apply a time-stamp received data. In certain embodiments, a common time reference may be received via communications interface 504, and accordingly, a separate time input may not be required. One such embodiment may employ the IEEE 1588 protocol. A data bus 524 may facilitate communication among various components of system 500.

Processor 506 may be configured to process communications received via communications interface 504 and time input 502 and to coordinate the operation of the other components of system 500. Processor 506 may operate using any number of processing rates and architectures. Processor 506 may be configured to perform any of the various algorithms and calculations described herein. Processor 506 may be embodied as a general purpose integrated circuit, an application specific integrated circuit, a field-programmable gate array, and/or any other suitable programmable logic device.

Instructions to be executed by processor 506 may be stored in random access memory 514 (RAM). Such instructions may include information for processing routing and processing data packets received via communications interface 504 based on a plurality of traffic flows.

A user-interface subsystem 528 may be configured to receive from a user various types of information relating to the creation of communication host profiles or to configuration of communication hosts using communication host profiles. In some embodiments, the user-interface subsystem may be configured to receive confirmation utilized in connection with customizable attributes, priority designations, alarm set points, etc. In some embodiments, the user-interface subsystem may include various configuration utilities operable to facilitate the process of obtaining configuration information from a user.

An SDN controller subsystem 530 may be configured to perform a variety of functions associated with an SDN. The SDN controller subsystem 530 may implement various SDN controller functions directly, or the SDN controller subsystem 530 may be configured to coordinate operations of system 500 with an SDN controller (not shown). The SDN controller subsystem 530 may be configured to specify the configuration of various communication hosts based on settings specified in a communication host profile.

A priority subsystem 532 may be configured to associate a priority designation with a traffic flow. In certain embodiments, a communication host profile may specify a priority designation associated with one or more data flows. In some embodiments, the priority designation may be specified as a repeatable attribute, while in other embodiments, the priority designation may be a customizable criterion that is specified by a user through the user-interface subsystem.

An alarm subsystem 526 may be configured to monitor various parameters associated with a transmission of data in an SDN. An alarm may be triggered based on alarm set points that may be specified in a host communication profile. The alarm set points may include, for example, a measurement of bandwidth utilization, a measurement of latency, a measurement of pack loss, and the like. The use of alarm set points in communication host profiles may help operators of a network to monitor the capacity and performance of a network.

A host communication profile subsystem 534 may be configured to create host communication profiles and to configure a communication host and an SDN based on a host communication profile. In some embodiments, host communication profile subsystem 534 may be configured to implement methods 400 and 450, which are illustrated in FIG. 4A and FIG. 4B, respectively. Returning to a discussion of FIG. 5, in the illustrated embodiment the profile creation and configuration subsystem may include a host communication profile database 535, which may be a repository of a variety of host communication profiles associated with various types of devices. In some embodiments, system 500 may automatically select an appropriate host communication profile from the host communication profile database 535. In other embodiments, user-interface subsystem 528 may further be configured to allow a user to manually select a host communication profile from the host communication profile database 535.

Traffic routing subsystem 536 may be configured to generate a variety of specific communication paths through the software defined network. The traffic routing subsystem 536 may identify a specific path including physical connections, routers, switches, etc. Traffic routing subsystem 536 may operate in conjunction with host communication profile subsystem 534 to and/or SDN controller subsystem 530 to generate communication paths for various traffic flows specified in a host communication profile.

While specific embodiments and applications of the disclosure have been illustrated and described, it is to be understood that the disclosure is not limited to the precise configurations and components disclosed herein. Accordingly, many changes may be made to the details of the above-described embodiments without departing from the underlying principles of this disclosure. The scope of the present invention should, therefore, be determined only by the following claims.

What is claimed is:

1. A system to automate configuration of a plurality of communication hosts based on a repeatable host profile, the communication hosts in communication with a software defined network (SDN) comprising a control plane and a data plane and associated with an electric power transmission and distribution system, the system comprising:
a first communication host configured to produce electric power transmission system data and in communication with the data plane of the SDN;
a second communication host configured to consume electric power transmission system data produced by the first communication host and in communication with the data plane of the SDN;
a plurality of switches disposed within the data plane of the SDN;
a communication host profile subsystem disposed within the control plane and in communication with the plurality of switches and configured to:
select a repeatable host profile for use with the plurality of switches from a plurality of repeatable host profiles, the repeatable host profile comprising at least one repeatable attribute and at least one customizable attribute, wherein the at least one repeatable attribute comprises at least a flow type;
apply the repeatable host profile to the plurality of switches; and
create at least one communication flow within the data plane of the SDN between the first communication host and the second communication host based on the at least one repeatable attribute and based on the at least one customizable attribute specified in the repeatable host profile; and
a traffic routing subsystem configured to implement the at least one communication flow within the data plane of the SDN between the first communication host and the second communication host.

2. The system of claim 1, wherein the at least one repeatable attribute also comprises a flow priority.

3. The system of claim 1, wherein the at least one repeatable attribute comprises an alarm set point associated with a characteristic of the SDN.

4. The system of claim 3, wherein the alarm set point comprises one of: a measurement of bandwidth utilization, a measurement of latency, a measurement of pack loss.

5. The system of claim 1, further comprising a hardware user-interface subsystem configured to obtain from a user at least one user-specified setting associated with the at least one customizable attribute.

6. The system of claim 1, wherein the at least one customizable attribute comprises one of a data flow specifying a data destination to receive information from at least one of the first and the second communication hosts, the data flow specifying a data source from which the at least one of the first and the second communication hosts receives information; and a unique identifier.

7. The system of claim 1, further comprising a communication host profile database comprising a plurality of repeatable communication host profiles.

8. The system of claim 1, wherein the first communication host and the second communication host each comprise a transmission line relay.

* * * * *